United States Patent Office 3,737,528
Patented June 5, 1973

3,737,528
CERTAIN OXIMINO PHOSPHORUS CONTAINING COMPOUNDS USED AS INSECTICIDES AND ACARICIDES
Arnold D. Gutman, Berkeley, Calif., assignor to Stauffer Chemical Company, New York, N.Y.
No Drawing. Original application Apr. 6, 1970, Ser. No. 26,150, now Patent No. 3,631,170. Divided and this appplication Jan. 11, 1971, Ser. No. 105,602
Int. Cl. A01n 9/36
U.S. Cl. 424—203      2 Claims

ABSTRACT OF THE DISCLOSURE

Compounds having the formula:

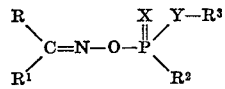

in which X is oxygen or sulfur; Y is oxygen or sulfur; R is alkyl; $R^1$ is alkyl; $R^2$ is alkyl or alkoxy and $R^3$ is a heterocyclic group, and their use as insecticides and acaricides are disclosed.

---

This application is a divisional of copending application Ser. No. 26,150, filed Apr. 6, 1970, now U.S. Pat. No. 3,631,170.

This invention relates to certain novel chemical compounds, and the use of the chemical compounds as insecticides and acaricides. More particularly, the chemical compounds are certain oximine phosphorus containing compounds.

The compounds of this invention are those having the formula

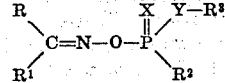

in which
X is oxygen or sulfur; Y is oxygen or sulfur;
R is alkyl having 1 to 4 carbon atoms, preferably branched chain or methyl, most preferably methyl;
$R^1$ is alkyl having 1 to 4 carbon atoms, preferably methyl;
$R^2$ is alkyl having 1 to 4 carbon atoms, preferably 1 to 2 carbon atoms; or alkoxy having 1 to 4 carbon atoms, preferably 1 to 2 carbon atoms;
$R^3$ is a heterocyclic group, preferably

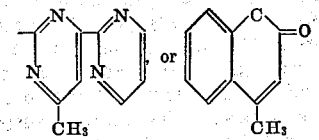

The compounds of the present invention can be prepared according to the following reactions:

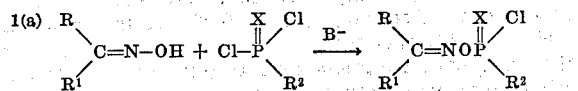

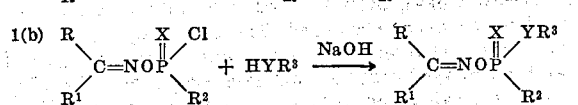

in which R, $R^1$, $R^2$, $R^3$, X and Y are as defined.

Preferably, reaction 1(a) is carried out by reacting preferably equal mole amounts of the two reactants. If an excess of either reactant is used, the reaction still proceeds but yields are reduced. The reactants can be combined in any desired manner but preferably, the reaction is run in a solvent such as THF by first preparing the salt of the oximine reactant with an acid acceptor such as potassium t-butoxide at room temperature and then preferably slowly adding the dichloride reactant thereto, preferably in solution with a solvent, for example, THF, at a temperature below about 15° C. for control. However, the oxime reactant can be used in place of the salt, preferably, in the presence of the acid acceptor. The resulting product is recovered and purified by standard procedure. For example, the resulting product can be recovered from the reaction mixture and purified from the reaction mixture by adding the mixture to a non-polar solvent such as benzene. The benzene mixture is then washed with water, dilute NaOH solution and then again by water. The benzene is evaporated after the water has been removed, for example, by treatment with anhydrous $MgSO_4$ to yield the purified product.

The reaction, reaction 1(b), is carried out by reacting preferably equal mole amounts of the two reactants. If an excess of either reactant is used, the reaction still proceeds but yields are reduced. The reactants can be combined in any manner but preferably the phosphorus-containing reactant is slowly added to the phenol or thiophenol reactant in a solvent such as THF, preferably with stirring. More preferably, an alkali metal salt of the phenol or thiophenol salt is used to reduce the chance of a violent reaction. The temperature of the reaction is not critical, however, better yields are obtained by heating the reactants at reflux for a time sufficient to allow completion of the reaction. The resulting product can be recovered from the reaction mixture and purified by standard procedures. For example, the desired reaction product can be recovered from the reaction mixture by adding the mixture to a non-polar solvent such as benzene. The benzene mixture is then washed with water, dilute NaOH solution and then again by water. The benzene is evaporated after the water has been removed, for example, by treatment with anhydrous $MgSO_4$ to yield the purified product.

Preparation of the compounds of this invention is illustrated by the following example:

EXAMPLE 1

7[O-acetoneoximino), ethylphosphonothioyl]-4-methyl coumarin

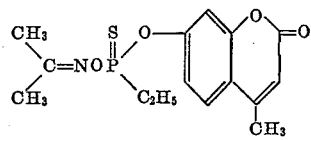

8.9 gms. (0.0505 mole) of 7-hydroxy-4-methyl coumarin, 2.1 grams (0.0525 mole) of caustic and 25 ml. of water are combined in a 500 ml. 3-neck flask fitted with a thermometer, stirrer, condenser, and dropping funnel. The mixture is stirred at room temperature until a solution is obtained, 280 ml. of tetrahydrofuran is added, and the mixture is cooled to 5° C. in an ice-bath. 10 gms. (0.0502 mole) of O-acetoneoximino, ethyl phosphorochloridate in 20 ml. of tetrahydrofuran is added to the stirring mixture over a period of 15 minutes while the temperature is maintained between 10 and 15° C. The resulting mixture is stirred at room temperature for 1 hour, is heated under reflux for 1 hour. The cooled mixture is poured into 500 ml. of benzene and washed with 3–250 ml. portions of water. The benzene phase is dried with anhydrous $MgSO_4$ and evaporated to yield 11.0 gms. (65% of theory) of the desired products. $N_D^{30}$ 1.5835.

The following is a table of certain selected compounds that are preparable according to the procedure described hereto. Compound numbers are assigned to each compound and are used throughout the remainder of the application.

TABLE I

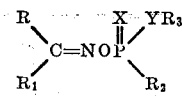

| Compound number | R | R₁ | R₂ | X | Y | R₃ | M.P. °C. or $N_D^{30}$ |
|---|---|---|---|---|---|---|---|
| 1 | CH₃ | CH₃ | C₂H₅ | S | O | (4-methyl-2-pyridyl) | 1.5288 |
| 2 | CH₃ | CH₃ | OC₂H₅ | S | S | Same as above | 1.5140 |
| 3 | CH₃ | CH₃ | OC₂H₅ | S | S | ...do... | 1.5050 |
| 4ᵃ | CH₃ | CH₃ | C₂H₅ | S | O | (4-methyl-coumarinyl) | 1.5835 |
| 5 | CH₃ | CH₃ | OC₂H₅ | O | O | Same as above | 1.5558 |
| 6 | CH₃ | CH₃ | OC₂H₅ | S | O | ...do... | 1.5690 |

ᵃ Prepared in Example 1.

Insecticidal evaluation tests.—The following insect species were used in evaluation tests for insecticidal activity:

(1) Housefly (HF)—*Musca domestica* (Linn.)
(2) German Roach (GR)—*Blatella germanica* (Linn.)
(3) Salt-Marsh Caterpillar (SMC)—*Estigmene Acrea* (Drury)
(4) Lygus Bug (LB)—*Lygus hesperus* (Knight)
(5) Bean Aphid (BA)—*Aphis fabae* (Scop.)

The Housefly (HF) was used in evaluation tests of selected compounds as insecticides by the following procedure. A stock solution containing 100 μg./ml. of the toxicant in an appropriate solvent was prepared. Aliquots of this solution were combined with 1 milliliter of an acetone-peanut oil solution in an aluminum dish and allowed to dry. The aliquots were there to achieve desired toxicant concentration ranging from 100 μg. per dish to that at which 50% mortality was attained. The dishes were placed in a circular cardboard cage, closed on the bottom with cellophane and covered on top with cloth netting. Twenty-five female houseflies, three to five days old, were introduced into the cage and the percent mortality was recorded after 48 hours. The LD₅₀ values are expressed in terms of μg. per 25 female flies. The results of these insecticidal evaluation tests are given in Table II under HF.

In the German Cockroach (GR) tests, 10 one-month old nymphs were placed in separate circular cardboard cages sealed on one end with cellophane and covered by a cloth netting on the other. Aliquots of the toxicants, dissolved in an appropriate solvent, were diluted in water containing 0.002% of a wetting agent, Sponto 221® (a polyoxyether of alkylated phenols blended with organic sulfonates). Test concentrations ranged from 0.1% downward to that at which 50% mortality was obtained. Each of the aqueous suspensions of the candidate compounds was sprayed onto the insects through the cloth netting by means of a hand-spray gun. Percent mortality in each case was recorded after 72 hours, and the LD₅₀ values, expressed as percent of toxicant in the aqueous spray, were recorded. These values are reported under the column GR in Table II.

For testing the Salt Marsh Caterpillar, test solutions were prepared in an identical manner and at concentrations the same as for the German Cockroach above. Sections of bitter dock (*Rumex obtusifolus*) leaves, 1–1.5 inches in length were immersed in the test solutions for 10 to 15 seconds and placed on a wire screen to dry. The dried leaf was placed on a moistened piece of filter paper in a Petri dish and infested with 5-3rd instar larvae. Mortality of the larvae was recorded after 72 hours and the LD₅₀ values are expressed as percent active ingredient in the aqueous suspension.

The Lygus Bug (LB) *Lygus hesperus* was tested similarly as the German Cockroach. The caged insects were sprayed with the candidate compounds at concentrations ranging from 0.05% downward to that at which 50% mortality was obtained. After twenty-four and seventy-two hours, counts were made to determine living and dead insects. The LD₅₀ (percent) values were calculated. These values are reported under the column LB in Table II.

The insect species black bean aphid (BA) *Aphis fabae* (Scop.) was also employed in the test for insecticidal activity. Young nasturtium (*Tropacolum* sp.) plants, approximately 2 to 3 inches tall, were used as the host plants for the bean aphid. The host plant was infested with approximately 50–75 of the aphids. The test chemical was dissolved in acetone added to water which contained a small amount of Sponto 221®, an emulsifying agent. The solution was applied as a spray to the infested plants. Concentrations ranged from 0.05 percent downward until an LD₅₀ value was achieved. These results are given in Table II under the column BA.

Acaricidal evaluation test.—The two-spotted mite (2SM), *Tetranychus urticae* (Koch), was employed in tests for miticides. Young pinto bean plants or lima bean plants (*Phaseolus* sp.) in the primary leaf stage were used as the host plants. The young pinto bean plants were infested with about 100 mites or various ages. Dispersions of candidate materials were prepared by dissolving 0.1 gram in 10 ml. of a suitable solvent, usually acetone. Aliquots of the toxicant solutions were suspended in water containing 0.002% v./v. Sponto 221®, polyoxyethylene ether sorbitan monolaurate, an emulsifying agent, the amount of water being sufficient to give concentrations of active ingredient ranging from 0.05% to that at which 50% mortality was obtained. The test suspensions were then sprayed on the infested plants to the point of run off. After seven days, mortalities of post-embryonic and ovicidal forms were determined. The percentage of kill was determined by comparison with control plants which had not been sprayed with the candidate compounds. The LD₅₀ values was calculated using well-known procedures. These values are reported under the columns 2SM-PE and 2SM-Eggs in Table II.

Systemic evaluation test.—This test evaluates the root absorption and upward trans-locations of the candidate systemic compound. The two-spotted mite (2 SM), *Tetranychus urticae* (Koch) and the Bean Aphid (BA), *Aphis*

*fabae* (Scop.) were employed in the test for systemic activity.

Young pinto bean plants in the primary leaf stage were used as host plants for the two-spotted mite. The pinto bean plants were placed in bottles containing 200 ml. of the test solution and held in place with cotton plugs. Only the roots were immersed. The test solutions were prepared by dissolving the compounds to be tested in a suitable solvent, usually acetone, and then diluting with distilled water. The final acetone concentration never exceeded about 1 percent. The toxicants were initially tested at a concentration of 10 parts per million (p.p.m.). Immediately after the host plant was placed in the test solution it was infested with the test species. Mortalities were determined after seven days.

Young nasturtium plants were used as the host plants for the bean aphid. The host plants were transplanted into one pound of soil that had been treated with the candidate compound. Immediately after planting in the treated soil the plants were infested with the aphids. Concentrations of toxicant in the soil ranged from 10 p.p.m. per pound of soil downward until an $LD_{50}$ value was obtained. Mortality was recorded after 72 hours.

The percentage of kill of each test species was determined by comparison with control plants placed in distilled water or untreated soil. The $LD_{50}$ values were calculated. These systemic test results are reported in Table II under the columns BA-sys and 2SM-sys.

fatty acid esters and other polyoxyethylene surface active agents. The proportion of these agents commonly comprises 1–15% by weight of the pesticidal compositions although the proportion is not critical and may be varied to suit any particular situation.

I claim:

1. A method of controlling insects comprising applying thereto, an insecticidally effective amount of the compound

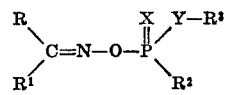

wherein X is sulfur, Y is oxygen, R is methyl, R' is methyl, $R^2$ is ethoxy and $R^3$ is the heterocyclic group

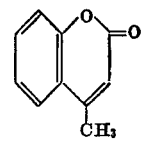

2. A method of controlling insects and acarids selected from the group consisting of house flies, lygus bugs, bean aphids and two-spotted mites comprising applying thereto, an insecticidally or acaricidally effecting amount of the compound

TABLE II

| | | | | | | $LD_{50}$ values | | | |
|---|---|---|---|---|---|---|---|---|---|
| | | | | | | | (2SM) Two-spotted mites | | |
| Compound number | HF, µg. | CR, percent | LB, percent | SMC, percent | BA, percent | BA-sys, p.p.m. | PE, percent | Eggs, percent | Sys, p.p.m. |
| 1 | 22 | .1 | .0008 | >.1 | .003 | >10.0 | .05 | >.05 | >10 |
| 2 | >100 | >.1 | .03 | >.1 | >.05 | >10.0 | >.05 | >.05 | >10 |
| 3 | >100 | >.1 | .05 | >.1 | >.05 | >10.0 | >.05 | >.05 | >10 |
| 4 | 35 | >.1 | .05 | >.1 | .0008 | >10.0 | .008 | .03 | >10 |
| 5 | >100 | >.1 | .03 | .1 | .01 | >10.0 | >.05 | >.05 | >10 |
| 6 | 9 | .08 | .005 | .1 | .003 | >10.0 | >.05 | >.05 | >10 |

As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic, or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol

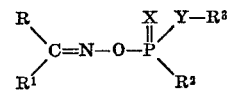

wherein X is sulfur, Y is oxygen, R is methyl, R' is methyl, $R^2$ is ethyl and $R^3$ is the heterocyclic group

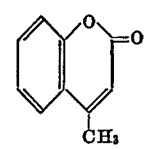

References Cited

UNITED STATES PATENTS

| 3,294,630 | 12/1966 | Poll et al. | 424—203 |
| 3,294,636 | 12/1966 | Brown et al. | 424—203 |
| 3,631,170 | 12/1971 | Gutman | 424—203 X |
| 3,159,630 | 12/1964 | Rigterin | 260—256.5 |
| 3,478,029 | 11/1969 | Schicke | 260—256.4 |

ALBERT T. MEYERS, Primary Examiner

L. SCHENKMAN, Assistant Examiner

U.S. Cl. X.R.

424—200